(12) United States Patent  
Kurtz et al.

(10) Patent No.: US 6,501,530 B2  
(45) Date of Patent: Dec. 31, 2002

(54) MOTION PICTURE FILM PROJECTOR ILLUMINATION SYSTEM FOR MINIMIZING FILM BUCKLE

(75) Inventors: Andrew F. Kurtz, Rochester, NY (US); Joshua M. Cobb, Victor, NY (US); Kenneth J. Repich, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 43 days.

(21) Appl. No.: 09/727,089

(22) Filed: Nov. 30, 2000

(65) Prior Publication Data

US 2002/0071099 A1 Jun. 13, 2002

Related U.S. Application Data

(60) Provisional application No. 60/241,685, filed on Oct. 19, 2000.

(51) Int. Cl.⁷ .............................................. G03B 21/32
(52) U.S. Cl. ...................................... 352/41; 352/198
(58) Field of Search ............................ 352/40, 41, 146, 352/198, 200; 353/23, 24, 38, 52, 102, 97; 355/35, 67

(56) References Cited

U.S. PATENT DOCUMENTS

| | | |
|---|---|---|
| 1,750,910 A | 3/1930 | Stark |
| 2,183,249 A | 12/1939 | Schering et al. |
| 2,186,123 A | 1/1940 | Rantsch et al. |
| 2,326,970 A | 8/1943 | Rantsch |
| 2,803,163 A | 8/1957 | Ulffers |
| 2,991,691 A | 7/1961 | Schering |
| 3,000,258 A * | 9/1961 | Misuraca ................... 353/112 |
| 3,179,007 A * | 4/1965 | Benford ...................... 202/251 |
| 3,241,440 A | 3/1966 | Kugler |
| 3,720,460 A | 3/1973 | Wilkinson |
| 3,941,475 A | 3/1976 | Sheets |
| 3,957,031 A | 5/1976 | Winston |
| 4,003,638 A | 1/1977 | Winston |
| 4,497,015 A | 1/1985 | Konno et al. |
| 4,560,260 A * | 12/1985 | Trumbull ................... 352/180 |
| 4,966,759 A | 10/1990 | Robertson et al. |
| 5,289,278 A | 2/1994 | Bird |
| 5,336,873 A * | 8/1994 | Imamura ................... 235/454 |
| 5,744,815 A * | 4/1998 | Gurevich et al. ...... 235/462.06 |
| 5,754,278 A | 5/1998 | Kurtz |
| 6,024,283 A * | 2/2000 | Campanelli et al. ... 235/462.32 |
| 6,172,734 B1 | 1/2001 | Wright |

OTHER PUBLICATIONS

W. Borberg; Modulating Air Blast for Reducing Film Buckle;Journal of the SMPTE, vol. 59, Aug. 1952, pp. 94–100.
P. Preo; Projection Performance of Theatrical Motion Picture Films using Xenon Short Arc Lamps; Journal of the SMPTE, Sep. 1983, pp. 938–944.

* cited by examiner

Primary Examiner—Russell Adams
Assistant Examiner—D. Ben Esplin
(74) Attorney, Agent, or Firm—Nelson Adrian Blish

(57) ABSTRACT

A motion picture film projector illumination system (100) for minimizing film buckle comprises a light source (405) for producing a beam of light (416). Beam shaping optics (411) focus the light beam onto a film through an aperture (408) having an aperture opening (410) corresponding to a film frame (324). A secondary beam steering optics (465) directs stray light around edges of the aperture to illuminate film edge to frame edge areas (446).

22 Claims, 11 Drawing Sheets

MOTION PICTURE FILM PROJECTOR ILLUMINATION SYSTEM FOR MINIMIZING FILM BUCKLE

CROSS REFERENCE TO RELATED APPLICATIONS

Reference is made to commonly-assigned U.S. patent application Ser. No. 60/241,685, filed Oct. 19, 2000 entitled SYSTEM FOR COMPENSATING FOR FILM FLUTTER IN A MOTION PICTURE PROJECTOR, by Morton et al., the disclosure of which is incorporated herein.

FIELD OF THE INVENTION

The invention relates to the field of motion picture film projectors, and in particular to an illumination system suitable for reducing film buckle in a film gate.

BACKGROUND OF THE INVENTION

Motion picture film projectors have been successfully used in theatres for decades to project high quality imagery. Aside from the development and popularization of very large screen film formats (such as 70 mm) and the associated projection equipment, the industry has made very few design changes to film projectors which actually improve the on screen image quality. Among the various problems which degrade the projected image quality, including the obvious scratches, dirt, and film jump and weave, film buckle is a less obvious, but perhaps the most significant, contributor to quality loss.

The basic phenomenon of film buckle is discussed in the paper "Modulating Air Blast for Reducing Film Buckle" by W. Borberg in the Journal of the SMPTE, Vol. 59, August 1952. While much of the light incident on the film is transmitted through it, and subsequently imaged to the screen by the projection lens, a portion of this light is absorbed, either by the dyes in the case of color film, or by the silver grains in the case of black and white film. Indeed, the images themselves are stored on the film as spatially varying density patterns, which rely on light absorption, rather than light reflection, to modulate the incident light. However, the absorbed light in turn heats the film, which then being an elastic material, deforms out of the film plane. This thermally induced deformation or pillowing can shift the image in a variable fashion, outside of the designed depth of focus of the projection lens, and degrade the on screen image resolution. Film buckle is further complicated by the action of the shutter, which is typically located between the lamp source and the film gate in most projectors. For example, when the popular two bladed shutters are used, the incident light to the film sees two short pulses of light per film frame. The film buckles during the first illumination period, relaxes some during the intervening dark period, and then buckles or deforms further during the second illumination period.

A variety of methods have been used or considered to alleviate or compensate for the problem of film buckle. In his paper, Borberg describes the results of his experiments to counter the film buckling with either continuous or pulsed inputs of pressurized air. Although the pressurized air undoubtedly cools the film to some extent, the pressurized air provides its greatest contribution to counteract buckle by providing a counteracting force to push against the deforming film surface. Unfortunately, while the pulsed air experiments were successful, the Borberg approach was not adopted by the industry due to the mechanical complications and the noise generated by the pressurized air system.

As another approach, a custom dichroic shutter, with blade areas which block visible radiation while transmitting the infrared has been attempted. The intent was to utilize the plentiful infrared radiation emitted by an unfiltered xenon arc lamp source to heat the film image area during the shuttered or dark periods, such that the thermal load and resulting film buckle would be averaged and less variable within the frame time. However, as color films transmit the greater majority of incident radiation, and absorbs perhaps as little as 5 percent of such light in the near infrared (out to ~2 nm), this method was only marginally effective. Furthermore, as discussed in the Borberg paper, and to a greater extent in another paper, "Projection Performance of Theatrical Motion Picture Films using Xenon Short Arc Lamps", by P. Preo, further heating of the film frame will cause yet further film deformation, and beyond certain thresholds, actual damage such as dye fade, blistering, or scorching.

Likewise, other approaches, such as preheating the film frame image area before projection, so as to reduce the range of deformation which would occur during projection, have been considered, but would only add further thermal loading to the film in a minimally useful manner.

The most effective method employed in the industry to counteract the effects of film buckle is to design the projection lenses with curved object "planes", such that the region of best focus follows a curve roughly corresponding to the curvature of the film deformation or buckle. While this technique has proven reasonably effective, the curved plane of best focus is static, while film buckle is dynamic, varying not only with the exposure time in the gate, but also with film density, the actual film type or dye layer formulation, and finally with the film base formulation.

Thus, it would be desirable to provide alternate approaches to the problem of film buckle in which the thermal deformation experienced within the film frame image area is actually reduced.

SUMMARY OF THE INVENTION

It is an object of the present invention to provide full film width illumination, rather than merely frame width illumination, which reduces film buckle by one-third to one-half, and thereby improves the projected image resolution. Targeted heating of the film can most effectively be applied to the areas between the film edges and frame edges by incident light, rather than some other means, such as a heater plate. Various optical system configurations are possible, based on both traditional and new optical illumination designs, where light can be directed onto the areas between the frame edges and the film edges, without cutting into the efficiency of the light delivered to the screen. This idea could also be used for film scanners.

The on-screen image quality provided by motion picture film projectors is significantly degraded by film buckle; that is warpage or deformation of the film when it is subjected to a heat load by the incident light. This warpage typically causes portions of the film to be deformed sufficiently that some portions of the image are displaced outside the projection lenses' depth of focus for optimal screen imaging, resulting in a loss in image resolution with field. The present invention corrects these deficiencies.

The invention and its objects and advantages will become apparent in the detailed description of the preferred embodiment presented below.

DETAILED DESCRIPTION OF THE INVENTION

Figure 1:
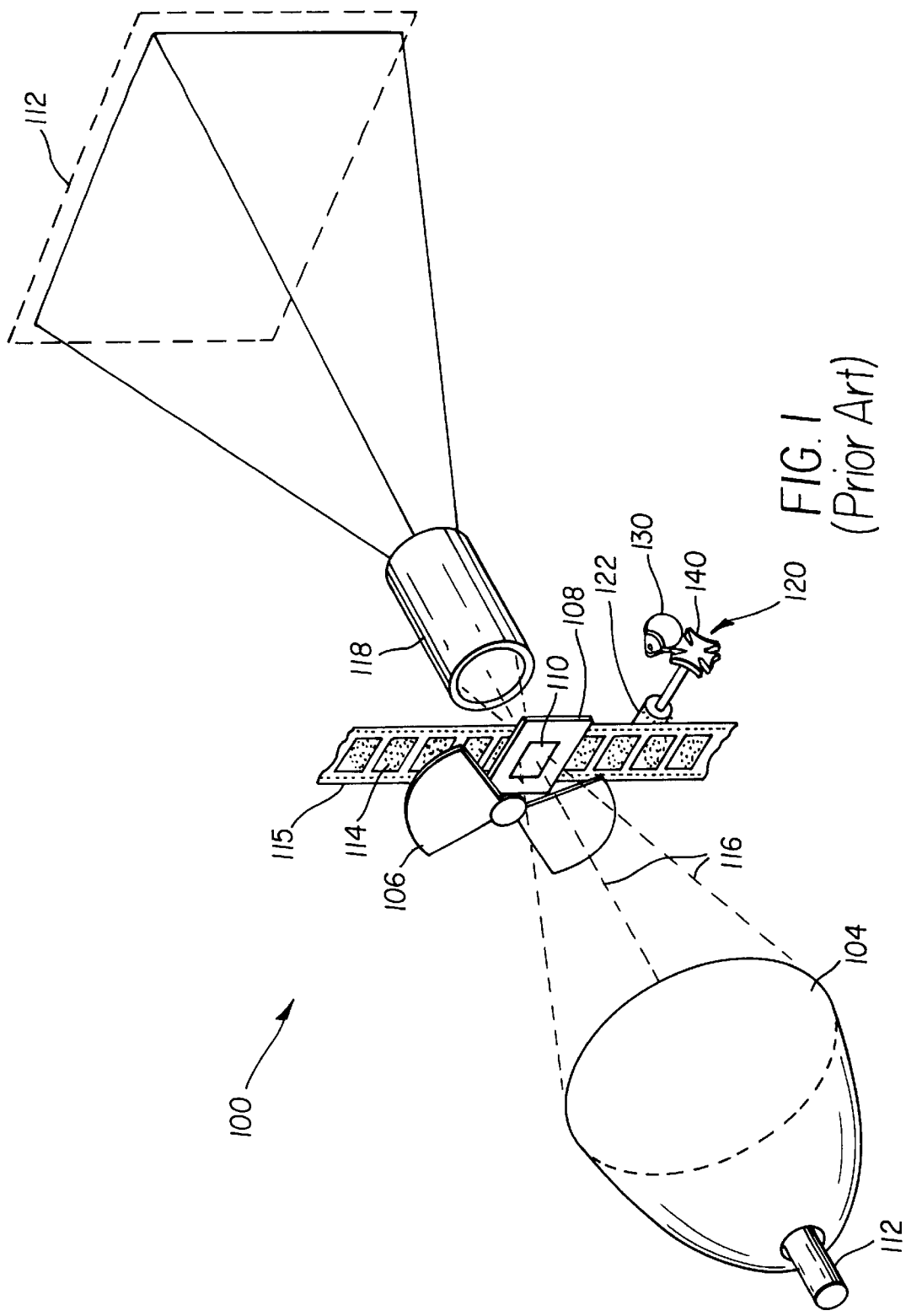
FIG. 1 is a perspective view of a prior art motion picture film projection system, including the arc lamp, reflector, aperture plate, film, and projection lens.

The traditional prior art motion picture film projector 100 is illustrated in FIG. 1, where a beam of light 116, generated by arc lamp 102 and elliptical reflector 104 is focused past shutter 106 and through aperture plate 108 to illuminate film frame 114 of film 115. Film frame 114 is imaged by projection lens 118 onto screen 112. Each film frame 114 is sequentially moved through a film gate (not shown) and past the aperture plate 108, by sprocket 122, which s driven by Geneva Mechanism 120, whose main components are star wheel 140 and driver 130.

Figure 2A:
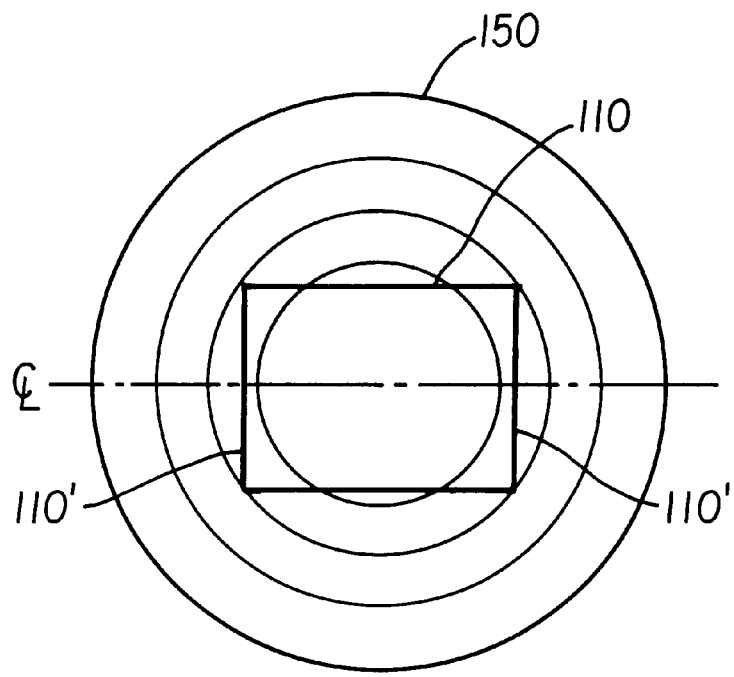
FIGS. 2a and 2b are illustrations of light irradiance profiles incident on a film plane which is created by the illumination system of the prior art projector.
Figure 2B:
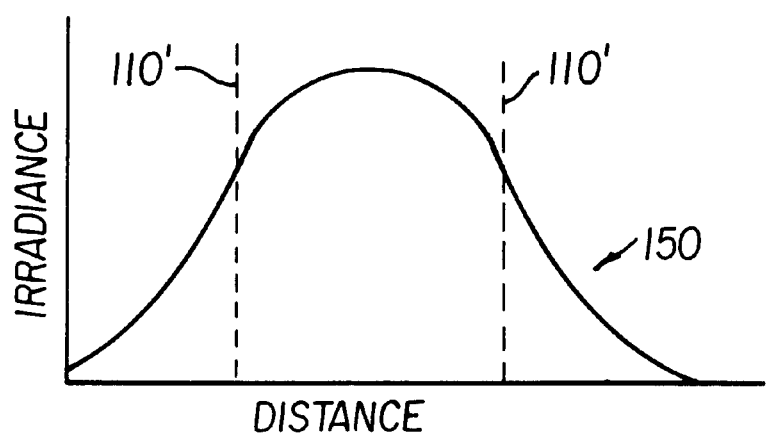

Light beam 116 focuses near the nominal film plane to create a large round spot of light, which is depicted in FIG. 2a. The focussed spot 150 of FIG. 2a is illustrated by a series of rings, to generally represent how the light intensity falls off as the distance from the center of the spot is increased. FIG. 2b shows an exemplary spot profile through the center of the spot, plotted as irradiance (light level) versus distance.

Overlayed on FIG. 2a is a rectangle, which represents the actual aperture 110 within aperture plate 108. For example, an aperture cut to illuminate a 35 mm "Scope" format film frame will be slightly larger than the nominal "Scope" format projection aperture dimensions, which are 21.95 mm wide×17.52 mm high. Lines 110' in FIG. 2b represent the edges of the illumination aperture 110, indicating the portion of the beam allowed through the film. The profile of the spot 150 depicted in FIG. 2b is generally Gaussian, and indicates an ~25% fall off in light level from frame center to frame edge. This is a generalization, as sometimes the fall off is only 10–20%, but ~50% fall-offs have been measured on the screens of some theatres. Likewise, while the fall off may be roughly Gaussian, beam profiles with "shoulders" to either side of the central hot spot, at ~70–75% of the peak light level, can also occur. Regardless of the above details in the light profile, the effect of the rectangular aperture 110 is that the area of film 115, which comprises a given film frame 114 in the gate, is illuminated with intense, and fairly non-uniform illumination. Meanwhile, as beam 116 focuses to form spot 150, a significant portion of the light goes astray and hits aperture plate 108 outside of the aperture 110, and is thus completely blocked from illuminating the film. Fundamentally, the large light spillage outside the target aperture originates with the large Lagrange (which is a measure of source brightness) typical of xenon arc lamp sources. As the source Lagrange, which is defined by both the size of the arc plasma and the light shaping properties of the reflector, is much larger than the collectable Lagrange (defined by the aperture and the projection lens F#), significant light is lost by spillage, or over-illumination. Generally, the projection aperture is defined by aperture plate 108, which is positioned on the lamp side of the projector, and which blocks light from hitting the film outside the film frame. In some motion picture film projector systems, a second and slightly smaller aperture may be positioned on the projection lens side of the film, to provide the final definition of the imaged area.

Figure 3:
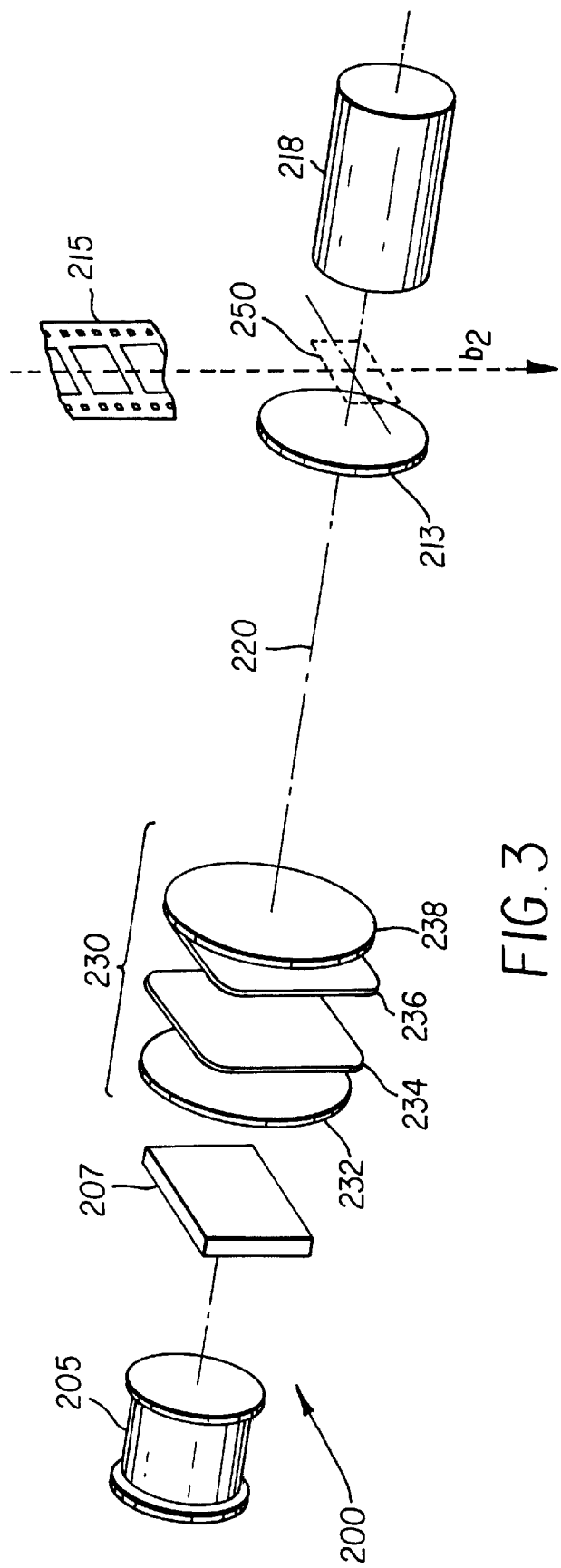
FIG. 3 is a perspective view of an alternate prior art motion picture film projector illumination system.
Figure 4:
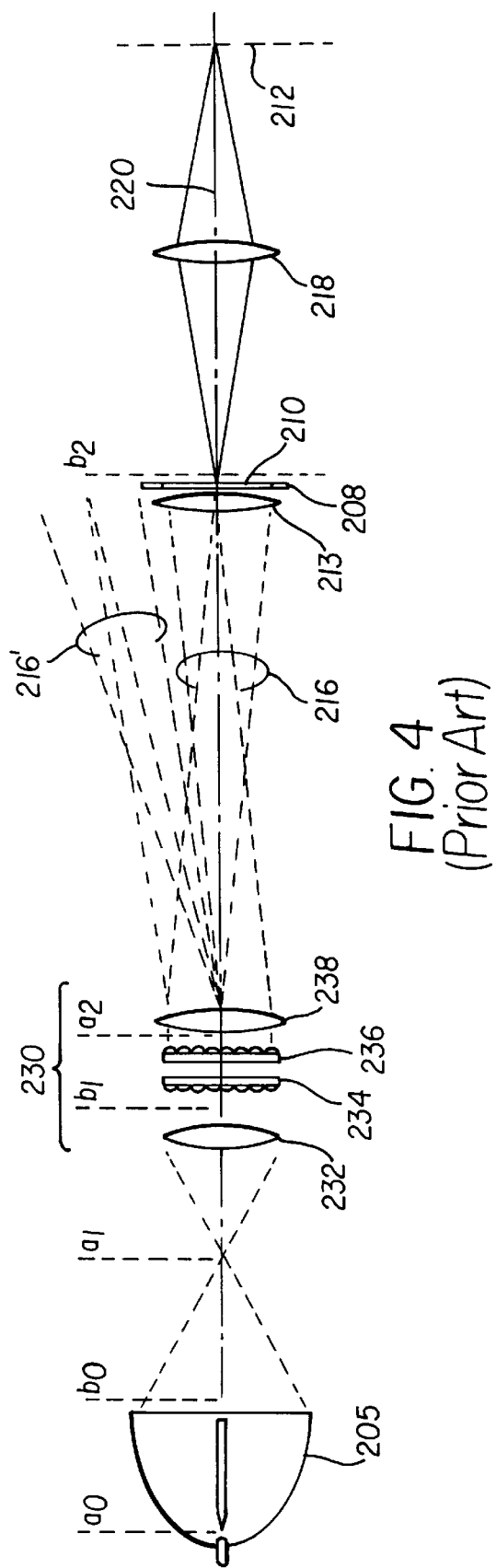
FIG. 4 is a detailed side view of the alternate prior art motion picture film projector illumination system shown in FIG. 3.

As indicated by the spot profiles illustrated in FIGS. 2a and 2b, the standard illumination system used in most motion picture film projectors is sub-optimal for both the efficiency and uniformity of illumination, both to the film and to the screen. Alternate designs for improved illumination systems applicable to film projectors are known in the prior art, which can provide both improved light efficiency and uniformity. In particular, FIGS. 3 and 4 illustrates one basic configuration for a film projection illumination system 200 using a Fly's Eye integrator 230 which is centered to optical axis 220. In FIG. 3, the light source, arc lamp 205, is depicted as an integrated assembly (such as a compact short arc xenon Cermax™ lamp from ILC Perkin Elmer, Sunnyvale, Calif.), although it can also be a traditional bulb xenon arc lamp, with a separate reflector, as was shown in FIG. 1. Arc lamp 205 is available with either an integrated elliptical or an integrated parabolic reflector, but generally the elliptical reflectorized lamp is preferable as it has a higher light collection efficiency. Filter 207 is representative of spectral filtering which may be employed in such a system; for example to remove the unwanted UV and IR radiation.

Light from lamp 205 is directed through beam shaping optics which includes a Fly's Eye integrator assembly 230, consisting of field lenses 232 and 238, and uniformizer lenslet arrays 234 and 236, all of which are aligned to optical axis 220. Individual lenslets within the lenslet arrays 234 and 236 would be rectangular in shape, with the same aspect ratio as the film frame. Assuming the system is designed without zooming optics to adapt to the other smaller film formats, the lenslets would have the same aspect ratio as that of the largest frame format, "Scope", which is ~1.2:1. Film projector illumination system 200 would project a beam of light onto plane $b_2$, to illuminate film 215 with a rectangular area of light 250 of generally uniform intensity (<10% variation). Projection lens 218 would then image each passing film frame in a consecutive fashion onto a distant screen (not shown). Optimally, to maximize light efficiency, film gate field lens 213 conjugates the composite beam passing through field lens 238 into the pupil of projection lens 218.

FIG. 4 is a cross-sectional view of the prior art system of FIG. 3, which is provided to explain the system operation in greater detail. For this particular layout, the arc plasma "ball", which is created between the electrodes of the arc lamp, is located at plane $a_0$. The exit face of the lamp, which is usually defined as the plane coincident with the lamp window or the reflector rim, is labeled as plane $b_0$. Light from the lamp 205 focuses at plane $a_1$, and then diverges to fill the defined aperture of field lens 232. A further lens (not shown) may be located at a plane $a_1$, which would nominally image the lamp exit face at plane $b_0$ to field lens 232. Either way, the far field of the lamp arc, or a conjugate plane ($b_1$) of the lamp exit face, is nominally located in the vicinity of field lens 232 or uniformizer lens 234. Uniformizer lenslet array 234 breaks the input beam into N beams, where N corresponds to the number of lenslets in the array, each of which has a rectangular aperture. Each of these beamlets is imaged into the corresponding lenslet of uniformizer lenslet array 236. Then each lenslet of uniformizer lenslet array 236 works with field lens 238, to in turn image its corresponding lenslet of uniformizer lenslet array 235 to the nominal film plane, which is identified as plane $b_2$. The N beams collected by the N lenslets of uniformizer lenslet array 238 are imaged in overlapping fashion by field lens 238 to form an overall rectangular area of uniform illumination, which passes through the aperture 210 of aperture plate 208, and illuminates the film 215 at or near plane $b_2$. Illumination beam 216, which is the composite of these N beams, encompasses all the light which will fall into the target illumination aperture 210. Again, projection lens 218 images the film, which is located at or near plane $b_2$, to a screen 212 located at a distant plane. To maximize efficiency, film gate field lens 213 conjugates the composite beam passing through field lens 238 into the pupil of projection lens 218. Optical aberrations within the illuminating beam 216 can effect the quality of projected image of film frame, but only in secondary ways, such as screen light efficiency, screen uniformity, and gross color fringing. Also an optional diffuser may be placed prior to the film, and perhaps even within the aperture 210, for the purpose of diffusing the light to suppress the imaging scratches and dirt to the screen. It should be noted that exact definitions of optical conjugacy throughout the system are imprecise, due to the large aberrations imparted to the beam by the arc lamp (including reflector). Further, in the system illumination analysis and design process, choices for light efficiency and illumination uniformity will dominate over the purity of the imaging relative to conjugate planes.

Figure 5A:
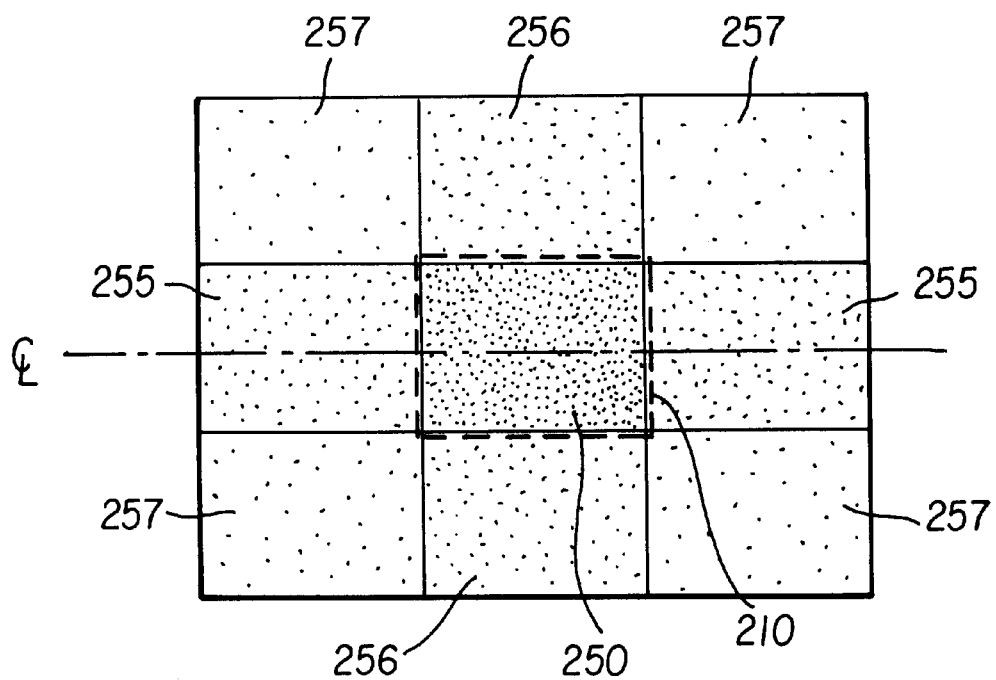
FIGS. 5a and 5b are illustrations of the light irradiance profiles incident on a film plane for the alternate prior art motion picture film projector system shown in FIG. 3.
Figure 5B:
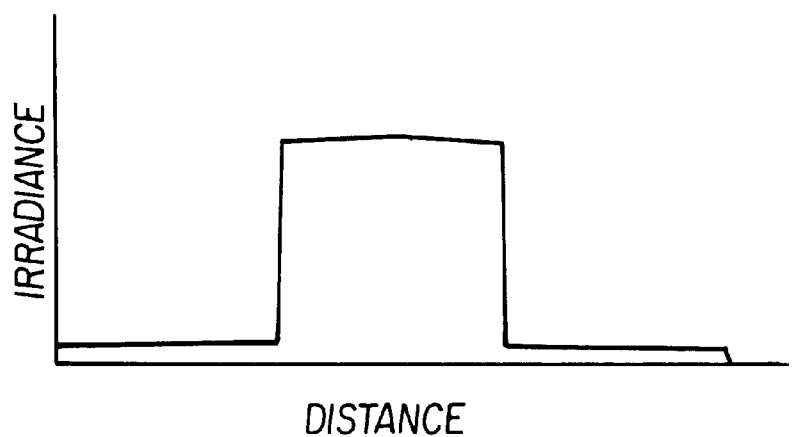

FIGS. 5a and 5b illustrate the topological and cross-section spatial profile of the light directed toward the $b_2$ plane by the illumination system 200 of FIGS. 3 and 4, neglecting vignetting by film gate field lens 213. As discussed, composite light beam 216 forms a rectangular area of intense uniform illumination 250, which ideally matches or is slightly larger than aperture 210. As compared to the illumination spot profile 150 depicted in FIGS. 2a and 2b for the FIG. 1 system 100, the nominal region of illumination (250) created by illumination system 200 is much brighter (+30% or more) and more uniform (<10% variation). However, even Fly's Eye integrator systems, when combined with large Lagrange sources like arc lamps, usually lose light as stray light, which spills into side lobes 255, 256, and 257, as depicted in FIGS. 5a and 5b, causing the total illumination to significantly overfill aperture 210. The four immediately adjacent side lobes, 255 and 256, are typically much brighter than the diagonal side lobes 257. However, in properly designed system, the four adjacent side lobes will have relatively little light (3–5% each, or 12–20% total). Side lobe beam 216', shown in FIG. 4, illustrates the general formation of this side lobe light or stray light, which becomes the spillage loss or overfill depicted in FIG. 5. Illuminating light 250 passes through aperture 210, illuminates a frame of film 215, and the film frame is subsequently imaged to the screen by the projector lens. Whereas the stray light in the side lobes 255, 256, and 257 is nominally blocked by the aperture plate 208 or some other baffle in the system and is not incident on the film 215.

Figure 6A:
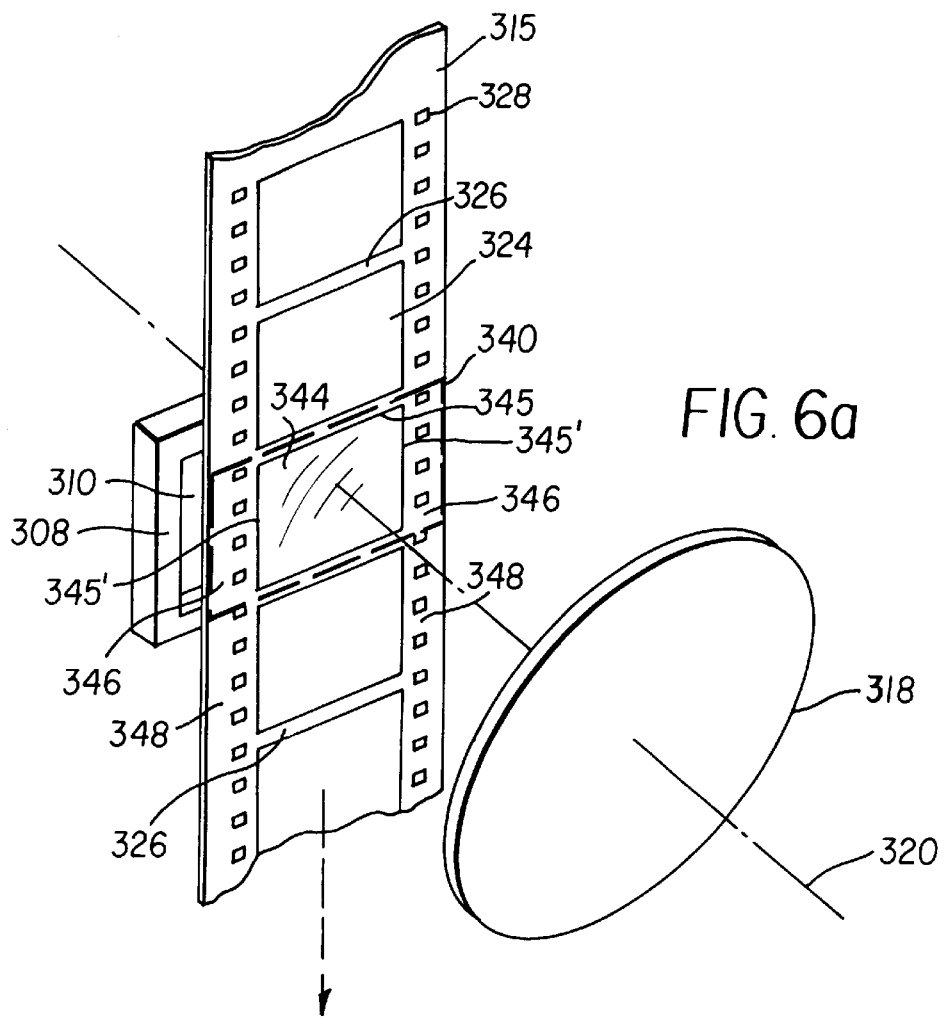
FIGS. 6a and 6b are perspective views of a film gate region of a film projector, featuring an aperture plate, a projection lens, and a film, with buckle occurring within the frame area.
Figure 6B:
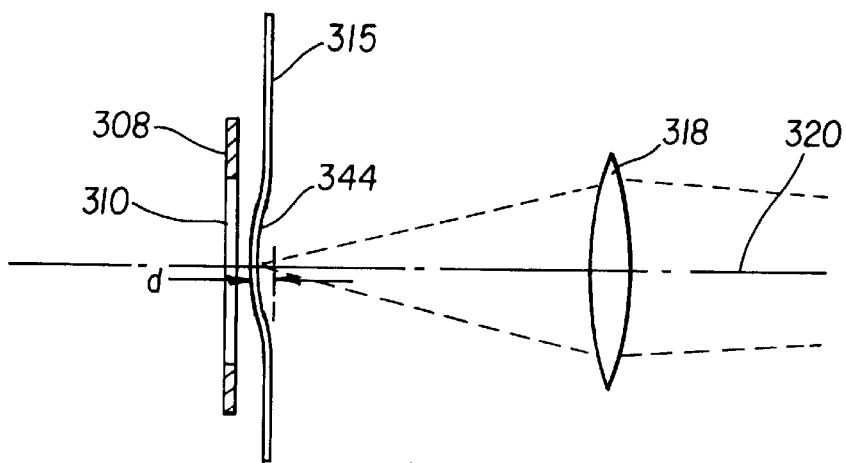

FIG. 6a, which is an exploded perspective view of the film gate area of a motion picture film projector, illustrates the relationship of the aperture plate 308, the film 315, the projection lens 318, and optical axis 320 in greater detail. FIG. 6b is a side view of the same film gate area. As shown in both of these figures, the illuminated region of the film of any given film frame 324 which is the gate, buckles or deforms, curving in towards the illumination source and away from the projection lens 318. Aperture opening 310 is approximately the same size and shape as film from 324. Aperture plate 308 is typically offset from film 315 by 1.0 mm or less, and indeed, may nearly be in contact with said film. As originally discussed by Borberg and Preo, typical film frame illumination levels cause the film buckle to curve away from the projection lens. Recent experiments have demonstrated that this directional bias to film buckle still holds, even with modern film stocks. It should be noted that Borberg further describes that there are higher incident light level thresholds where the film buckle bias direction flips towards the projection lens; and then higher levels yet, where permanent film damage occurs. Film buckle, which is variable with image density, film type, the incident light level, and shutter timing, among other factors, can easily vary between 150 and 400 microns of film surface curvature (distance d of FIG. 6b). Comparatively, projection lenses, which are standardized for a nominal F/2.3 collection at the film, only have a depth of focus of ~+/–50 microns at the film (based on through focus MTF). As noted previously, some projection lenses are designed to image a curved object "plane," of typically ~150 microns depth. Thus, even for a projection lens whose depth of focus is enhanced by a designed field curvature, thermal buckling induced surface curvature can easily shift the film, and in particular the internal dye or silver layers which bear image information, beyond the focal range of the lens. This is often evident as a progressive fall off in the on screen projected image sharpness (or MTF; Modulation Transfer Function) as the distance from center screen increases. Although some theatres utilize curved or torodially shaped screens, rather than flat screens, such screens primarily improve perceived screen brightness rather than the image sharpness.

Figure 7:
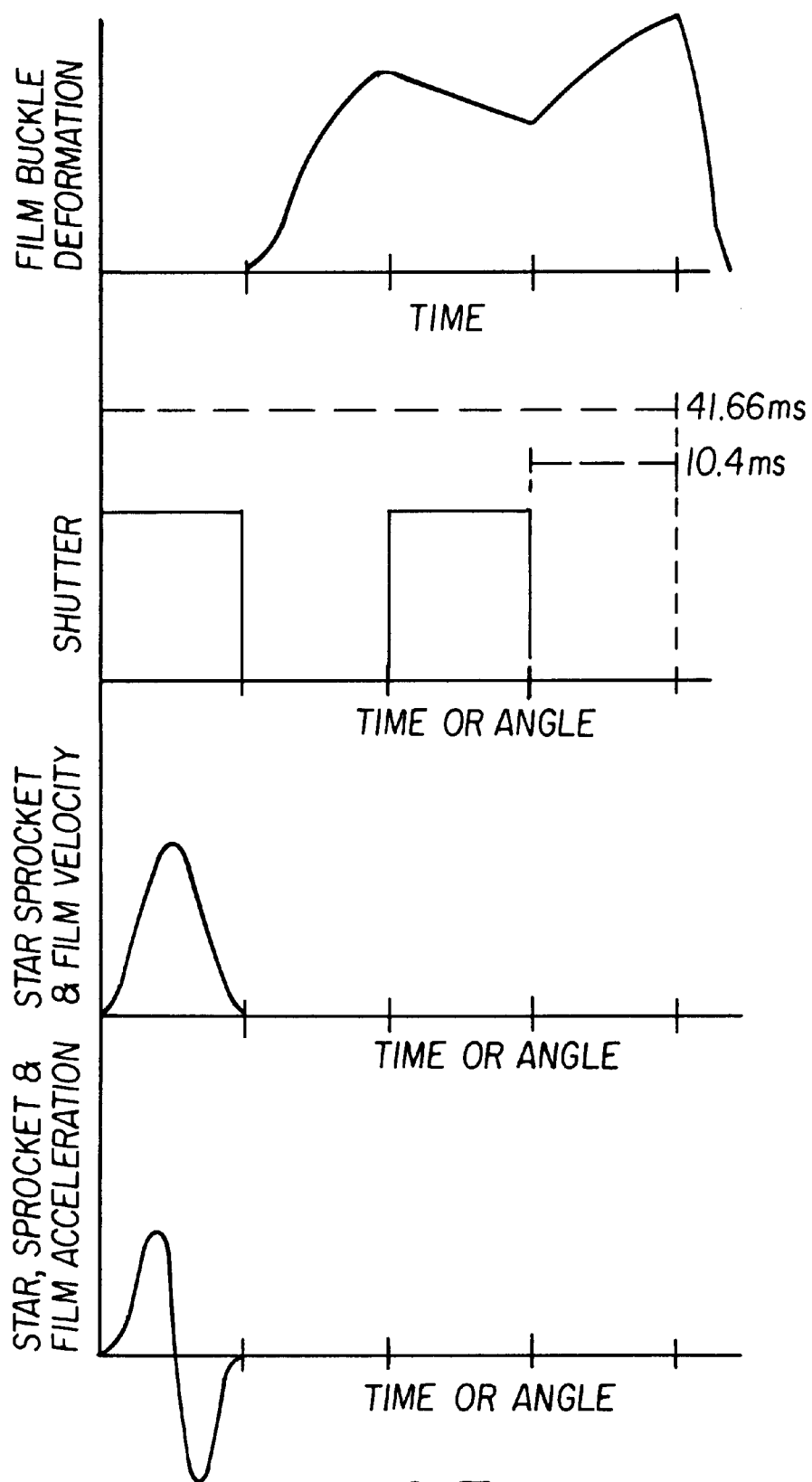
FIG. 7 is a timing diagram relating the action of a Geneva Mechanism to that of a shutter.

FIG. 7 is an overall timing diagram of the activity which occurs during a frame time. As motion picture film is typically projected at 24 fps, any single frame is in the film gate for ~42 ms total. For a projector using a conventional Geneva Mechanism, a film frame is positioned into alignment with the projection aperture during ¼ of that time, or ~10.4 ms, after which the film is held stationary for the remainder of the frame time. A conventional two bladed shutter blocks light from the film during this time, so that the abrupt film motion is not observed by the audience. As the human visual system is highly perceptive to flicker or strobing at 24 Hz, the shutter is provided with a second equally sized and symmetrically spaced shutter blade, which blocks the light to the screen during the third quarter of the frame time. Again, referring to FIG. 7, thermal deformation from absorbed light causes film buckle to begin almost instantaneously when light is incident on the film. The depth of the surface deformation continues to increase throughout the second quarter of the frame time, the film then partially relaxes during the third quarter when the shutter again blocks the light. During the fourth quarter of the frame time, the magnitude of the film buckle continues to increase further, until the end of the frame time, when the shutter closes, and the film frame is abruptly transported out of the gate by the intermittent (Geneva) mechanism.

While light absorption causes an essentially instantaneous thermal loading of the film, given the generally insulative nature of film, which is a dielectric rather than conductive structure, the potential mechanisms to remove or moderate the heat load on the film are relatively ineffective within the relevant time periods. For example, the thermal time constants for useful radiative or convective cooling into the air, even with forced air, are too long to provide significant relief. Likewise, conductive cooling from the film into a neighboring surface is also of little value. Rather, within the frame time, and indeed several frame times, the heat largely remains trapped within the film, and specifically within the areas of the film heated by the absorbed light. Within the heated regions, the temperature may be elevated by ~200° C. or more. Differential thermal expansion between the emulsion and base sides of the film causes the film to buckle towards the emulsion layer, which for a print film, faces inwards towards the lamp source. Referring again to FIGS. 6a and 6b, linear regions of mechanical stress form along the upper frame edges 345 and side frame edges 345', at the boundary regions between the illuminated and heated areas and the adjacent un-illuminated and unheated areas. Film 315 then experiences buckling within the illuminated film frame 344, while adjacent un-illuminated regions of the film, such as the subsequent film frame 324, framing bars 326 and the film edge to frame edge areas 346, are largely unaffected.

Among the potential methods to reduce thermally induced film buckling, including providing improved system light efficiency, whether from an improved illumination system, improved Geneva Mechanism, or improved shutter, could have the greatest impact, provided the improvements in light efficiency are used to reduce the lamp power. However, it has been established that full width heating of the film can also reduce film buckle by as much as one-third to one-half. In particular, with references to FIGS. 6a and 6b, heating of the film within the entire area 340, which includes film frame 344 and film edge to frame edge areas 346, will reduce the depth "d" of the film buckle deformation. In particular, with such film edge to film edge heating, the stressed areas along the side edges 345' of the film frame 344 are removed. Lines of stress still form near the top and bottom edges 345 of film frame 344, extending from one film edge to the other film edge. But the resulting film buckle has a cylindrical surface profile, rather than the prior more spherical surface profile, and the depth "d" of the deformation is reduced. Numerous methods could be considered to apply heat to the two film edge to frame edge areas 346, including resistive thermal heads or heater plates. While such devices can apply some heat fairly quickly, for example within a few milliseconds, physical contact with the film would be required. This method is not preferred, as the film could be damaged, with scratches or tears at the perforations. Thus, radiative heat transfer, or light absorption, is the preferred method to apply heat to the film.

As the market for motion picture film projectors is highly cost competitive, it may be advantageous to use the xenon arc lamp which illuminates the film for image projection as a radiative heat source for frame edge to film edge heating, as compared to adding secondary radiative sources. The xenon arc lamp is of course, potentially a very useful source for radiative heating, as it emits not only visible light, but UV and IR as well. In the near UV, significant light emission begins at ~250 nm, and extends up to the blue edge at ~400 mn. Furthermore, while typical motion picture film stocks are viable transmissive in the visible, they become significant UV absorbers below ~350 nm. However, in imaging applications involving human vision, the UV is filtered out immediately for safety reasons. By comparison, xenon arc lamp emit considerable IR, but most of the IR light is emitted between 800–1100 nm, beyond which, light emissions gradually diminish to insignificance at ~2100 nm. However, motion picture film is a poor absorber in the near infrared, with ~90% average transmission from ~800 nm to 2000 nm. While this infrared light could be used to heat the film (~4% absorption), most of the heat would be undesirably imparted to the adjacent structures of the film gate and projector. Given these varied circumstances, it would be highly effective to salvage some of the visible light lost to spillage, and direct it onto the film edge to frame edge areas, so as to alter the stress contours and reduce buckle. Typically, within areas 346 between the film edges 348 and the film frame 344, film 315 includes perforations 328, sound track records (not shown), the printed "keycode" (code information for film type, manufacturer, etc.) (also not shown), and stray light absorbing areas (not shown). Thus, although film density is variable within these areas 346, typically there is significant film density, and thus potential for light absorption, over much of the respective surface areas. Of course, the applied light levels must be low enough not to cause dye fade, particularly within the sound track areas.

As described previously, with regards to FIGS. 2 and 5, significant light is lost outside the target illumination aperture for both the conventional elliptical reflectorized systems and the Fly's Eye based systems. Furthermore, as the lamp size is increased from a 1.5 kW lamp for a small screen, up to a 7 kW lamp for the largest screens, the spillage loss also increases. However, some of this lost light, or spillage, can instead provide targeted illumination to the film edge to frame edge areas 346 depicted in FIG. 6. For the greatest effect in reducing the thermally induced stress areas 346 should be both uniform and of equivalent power as the illumination within the frame 344. However, if the illumination or heat applied to areas 346 is at a reduced level, for example averaging only 30–40% of the illumination or heat within the frame areas, significant reductions in the magnitude of the film buckle can still be realized.

For the traditional projector (as in FIG. 1), where beam shaping optics are not used to improve the light efficiency, the film gate could be modified such that a portion of the stray light, or spillage lost light, which falls immediately outside aperture 110 (see FIG. 2) passes through an expanded aperture plate 308 and thus illuminates the target film edge to frame edge areas 346 (shown in FIG. 6). Specifically, aperture 310 within aperture plate 308 would be enlarged to facilitate illumination of both the film frame 344 and the two adjacent film edge to frame edge areas 346. While this approach will work, it may be desirable to use more sophisticated beam shaping optics, either to cope with complications imposed by the film gate design, or to improve light delivery to the target frame edge to film edge areas.

Likewise, the standard Fly's Eye type illumination shown in FIGS. 4 and 5 could be altered in a straight forward way to illuminate the width of the film, from film edge to film edge, while illuminating the frame height. For example, the Fly's Eye assembly 230 could be designed using lenslets with a ~2:1 aspect ratio, corresponding to the aspect ratio at the film for "Scope" format (35 mm film width and a 17.5 mm frame height). As a result, the entire area comprising film frame 344 and both target film edge to frame edge areas 346 would be illuminated in a nearly uniform manner. While such illumination would maximize the reduction of film buckle due to uniform thermal loading, the system light efficiency would be greatly reduced. In such a case, with the Fly's Eye system designed to illuminate the film edge to edge, instead of only with the film frame, light lost into the lateral side lobes 255 (FIG. 5a) would be somewhat reduced, as this some of side lobe light would illuminate the film instead. However, this slight gain in useful light from the side lobes is overwhelmed by the 37% increase in the uniformly illuminated area. Thus, much of the improvement in light efficiency provided by using a Fly's Eye type illumination system, as that in FIG. 4, instead of the traditional system of FIG. 1, is sacrificed for the purpose of reducing film buckle. More optimally, the light efficient Fly's Eye type illumination system could be altered to provide light for illuminating the frame edge to film edge areas to reduce film buckle with the stray or spillage light, while retaining the efficient use of the light intended to fall within the film frame.

Figure 8:
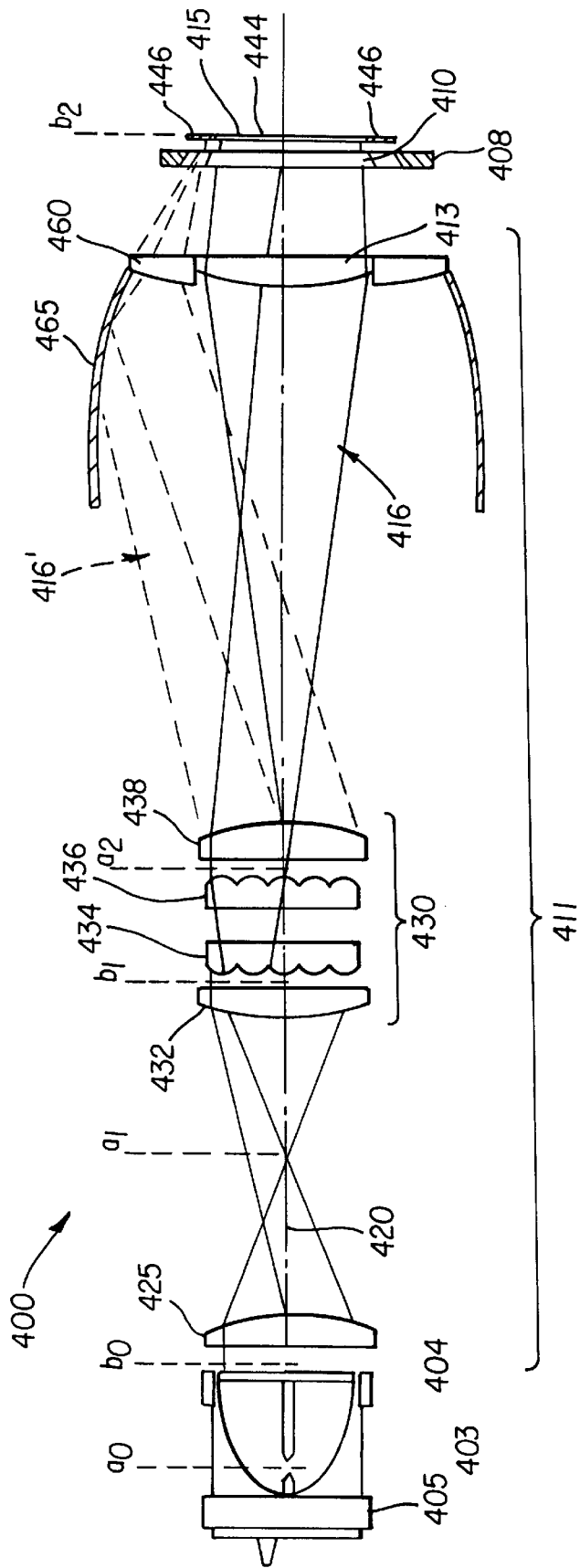
FIG. 8 is a detailed top view of an illumination system according to the present invention.

The first embodiment of the present invention, as illustrated in FIG. 8, is a modification of Fly's Eye illumination system, with additional optics included to direct the stray side lobe light (spillage loss) onto the target film edge to frame edge areas. As in the FIG. 3 system, for illumination system 400 of FIG. 8, light from the lamp 405 focuses at a plane $a_1$, and then diverges to fill the defined aperture of field lens 432, which is part of Fly's Eye assembly 430. Beam shaping optics 411 comprise condensing lens 425, Fly's eye assembly 430, and film gate field lens 413, all of which are aligned to optical axis 420. The far field of the lamp arc, or a conjugate plane ($b_1$) of the lamp exit face, is nominally located in the vicinity of field lens 432 or uniformizer lens 434. Uniformizer lenslet array 434 breaks the input beam into N beams, where N corresponds to the number of lenslets in the array, each of which has a rectangular aperture. Each of these beamlets is imaged into the corresponding lenslet field lens 438, to in turn image its corresponding lenslet of uniformizer lenslet array 436. Then each lenslet of uniformizer lenslet array 434 to the nominal film plane, which is identified as plane $b_2$. The N beams collected by the N lenslets of uniformizer lenslet array 438 are imaged in overlapping fashion by field lens 438 to form an overall rectangular area of uniform illumination, which passes through the aperture 410 of aperture plate 408, and illuminates the film 415 at or near plane $b_2$. Illumination beam 416, which is the composite of these N beams, encompasses all the light which will fall into the target illumination aperture 410, which is centered about optical axis 420. Additionally, system 400 includes secondary beam steering and concentrating optics, which collects stray light represented as side lobe beam 416', and then redirects and focuses this light onto the film edge to frame edge areas 446. As the relative light level in the side lobes of an efficient Fly's Eye based illumination system is fairly low (~4%), it is not sufficient to illuminate the target film edge to frame edge areas with a small portion of the side lobe light, but rather it is desirable to collect and redirect most of the side lobe light, and then focus this light to the target regions.

Thus, as shown in FIG. 8, secondary beam steering and concentrating optics are used, comprising mirror 465 and off axis lens 460. Referring again to FIGS. 5a and 5b, each of the laterally adjacent side lobes 225 can potentially be compressed and focused onto the target film edge to frame edge area 446 (FIG. 8) corresponding to its side of film frame 444. As the film edge to frame edge areas 446 are to be heated, and not the adjacent areas above and below the film frame (such as the framing bars and adjacent frames), the vertically adjacent side lobes 256 of FIG. 5 are not collected and focused onto the film. Thus, as the intention is to compress the rectangular area of stray light represented by side lobe 416' into a rectangularly shaped film edge to frame edge area 446, the beam steering and concentrating optics, mirror 465 and off axis lens 460, are cylindrical in cross section, rather than spherically symmetric. While mirror 465 could be planar, or even made with several faceted surfaces, the concentrating performance of mirror 465 would be enhanced if it possessed a designed shape. For example, mirror 465 may be a non-imaging optical concentrator, such as a CPC (compound parabolic concentrator). Off axis lens 460, focuses side lobe beam 416', including directly incident light, as well as light which was redirected by mirror 465, onto the target film edge to frame edge area 446. The off axis bias is designed into lens 460, so as to shift the light inwards, to the target area 446, which is closer to the system optical axis 420, than where the light would have gone otherwise. For simplicity, off axis lens 460 is in the same plane as film gate field lens 413 could be integrated together as one part, either directly by molding, or indirectly with optical adhesive. Film gate field lens 413 is offset by some distance along the optical axis 470 from the aperture plate 408 and film 415, so that space is available for other projector hardware, including the shutter and film gate mechanics. Other projector designs are possible, where the offset distance could be minimized. For example, if the shutter was located at the $a_1$ plane of system 400, then film gate field lens 413 could be located much closer to aperture plate 408. Then the side lobe beam steering and concentrating optics might be designed without off axis lens 460, and only with a shaped non-imaging optically concentrating optics might be designed without off axis lens 460, and only with a shaped non-imaging optically concentrating mirror 465, which would extend right up to aperture plate 408. As the light incident to the film edge to frame edge areas 446 is meant to be absorbed, and converted to heat, rather than imaged to the screen, the quality of redirected and focused side lobe 416' does not much matter. This beam can possess both rather large aberrations (as considered relative to imaging optics) and be incident at extreme angles. The main requirement is that the light profile of the incident light be sufficiently uniform that the heating is effective at reducing stress in the film. For example, a 50% variation in light intensity within this region is still acceptable.

Figure 9:
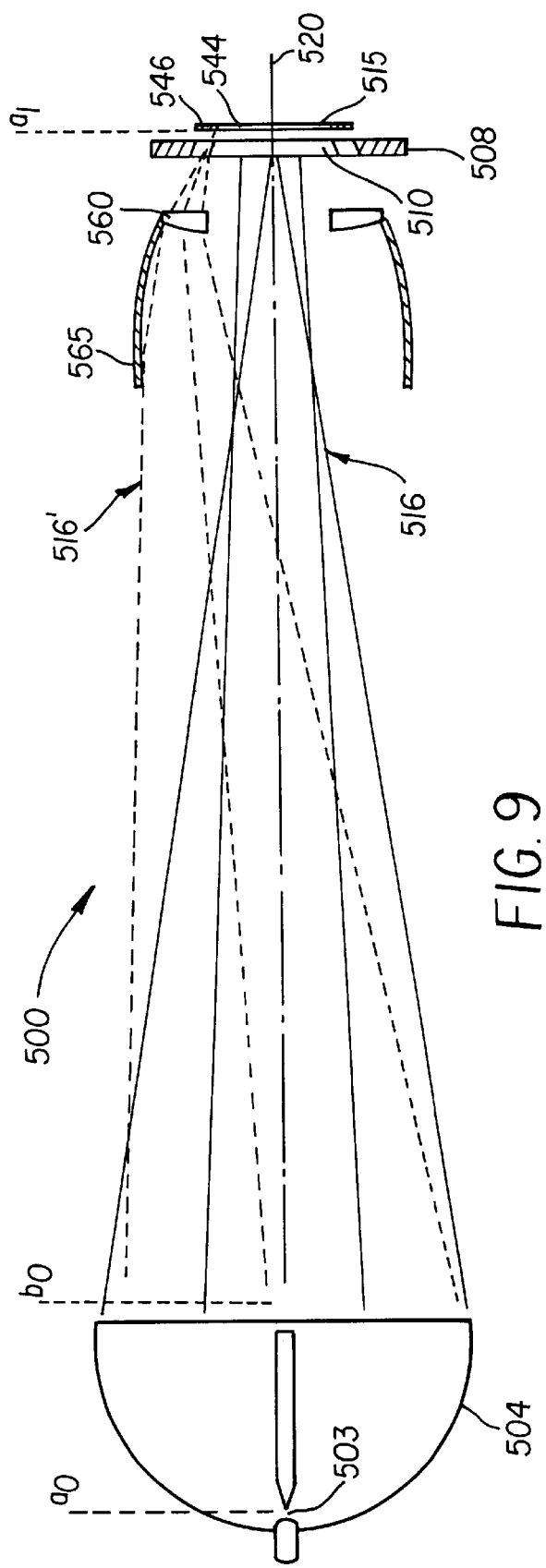
FIG. 9 is a detailed top view of the second embodiment of an illumination system according to the present invention.

The second embodiment of the present invention, as illustrated in FIG. 9, is a modification of the traditional motion picture projector lamphouse (as shown in FIG. 1), but with secondary beam steering and concentrating optics for illuminating the film edge to frame edge portions of the film also included. For illumination system 500 of FIG. 9, a beam of light 516 is created by arc lamp 502, which is positioned near the focus of elliptical reflector 504. Beam of light 516 is focused through the aperture 510 of aperture plate 508 to illuminate a frame of the film 515. Referring again to FIG. 2, typically there is a considerable portion of stray light which overfills the aperture 108 (508 in FIG. 9), and is lost to baffling within a motion picture film projector. As discussed previously, this light could be allowed to simply propagate forward and illuminate the target frame edge of film edge areas. On the otherhand, as the light fall off in traditional projectors varies considerably in both intensity and profile, system 500, which employs the standard arc source 505 with elliptical reflector, to form a beam 516 directed along optical axis 520, can also include secondary beam steering and concentration optics. These secondary beam steering optics collect stray light from overfill light beam 516', and then redirect and focus this light onto the film edge to frame edge areas 546.

FIG. 9 shows one example where the secondary beam steering and concentrating optics comprise mirror 565 and off axis lens 560. Referring again to FIG. 2, typically there is a considerable portion of stray light which overfills the aperture 108 (508 in FIG. 9), and is lost to baffling within a motion picture film projector. As with the system 400 of FIG. 8, some of the overfill light can be redirected and concentrated to illuminate the film edge to frame edge areas. As illumination systems based on conventional rotationally symmetric elliptical reflectors waste significantly more light outside the projection aperture, than does a Fly's Eye based system, the design for the secondary beam steering and concentrating optics, such as for mirror 565 and off axis lens 560, can be less aggressive. Otherwise, system 500 of FIG. 9 is designed by the same principles as system 400 in FIG. 8. That is, the intention is to compress overfill light beam 516' into a rectangularly shaped film edge to frame edge area 546 using beam steering and concentrating optics, such as mirror 565 and off axis lens 560. Both elements are nominally cylindrical in cross section, while mirror 565 has enhanced performance if it has a designed shape, such as that of a CPC (compound parabolic concentrator). Off axis lens 560, focuses and shifts overfill light beam 516', to condense it onto the target edge to frame edge area 546. Likewise, as before, the offset distance between the beam steering and concentrating optics and the aperture plate 508 can be minimized, mirror 565 could be shaped to extend right up to aperture 508. Again, the main requirement is that the light profile of the incident light be sufficiently uniform the heating is effective at reducing stress in the film. It should be noted that alternate lamp houses are commercially available, in which a standard bulb type xenon arc lamp is fit within a compound reflector, which includes both elliptical and spherical portions. These systems provide better light collection, but even so light inefficiencies are such that significant light would still be available outside the projection aperture to use for illuminating the film edge to frame edge areas, without stealing light that would otherwise be directed to the projection aperture.

Figure 10:
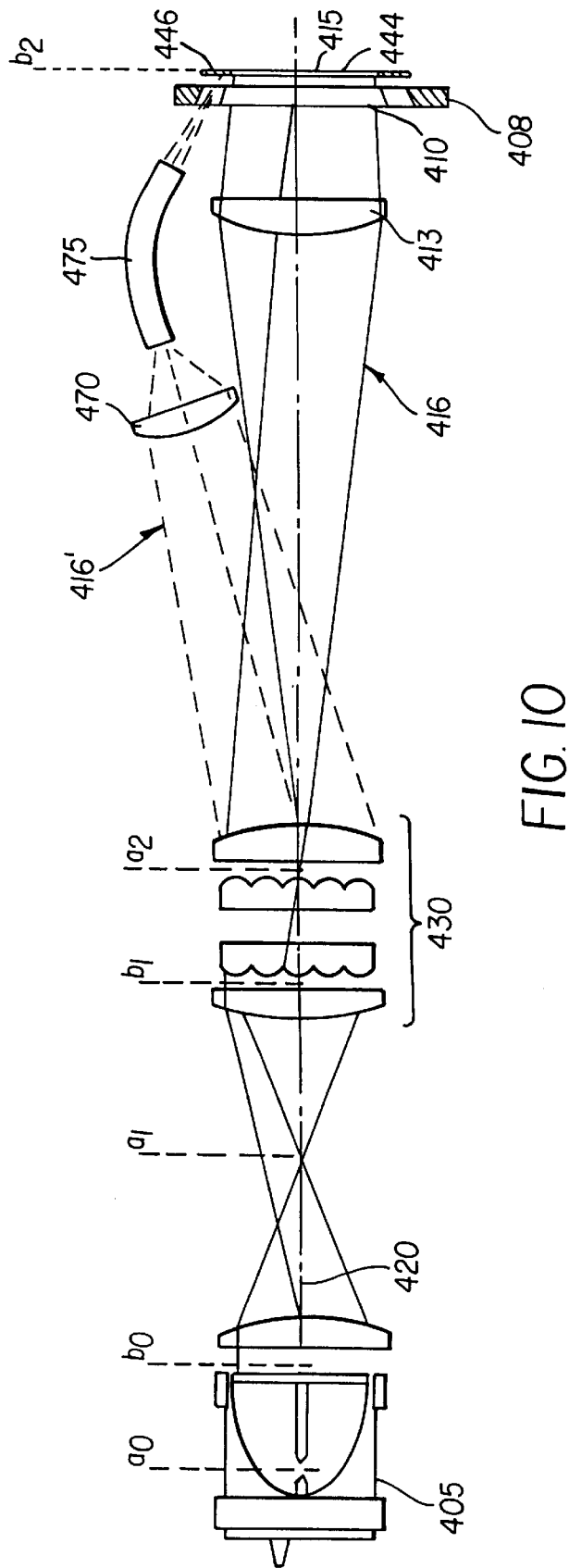
FIG. 10 illustrates an alternate configuration of the Fly's Eye system of FIG. 8.

Although the systems of FIGS. 8 and 9 are shown using non-imaging optical concentrating mirrors and off axis lens sections to construct the secondary beam steering and concentrating optics used to redirect the spillage (stray) light to illuminate the target frame edge to film edge areas, other combinations of optics, including mirrors, lenses, light pipes, and fiber bundles, could be employed, depending on the mechanical space constraints. For example, an alternate configuration of the Fly's Eye based illumination system of FIG. 8 is shown in FIG. 10, where the secondary beam steering and concentrating optics comprise condensing lens 470, light pipe 475, and a focusing lens (not shown). Condensing lens 470 focuses some or all of the side lobe light 416' into light pipe 475. Light pipe 475, which may be a solid bar made of glass or plastic, a flexible liquid light pipe, or a flexible fiber optic bundle, is routed forward to then emit light towards a target frame edge to film edge area 446. A second lens (not shown) may be placed at the output end of light pipe 475, to focus the light onto the target frame edge to film edge area 446. The output of light pipe 475 may have a rectangular cross section matching the shape of a film edge to frame edge area.

Figure 11:
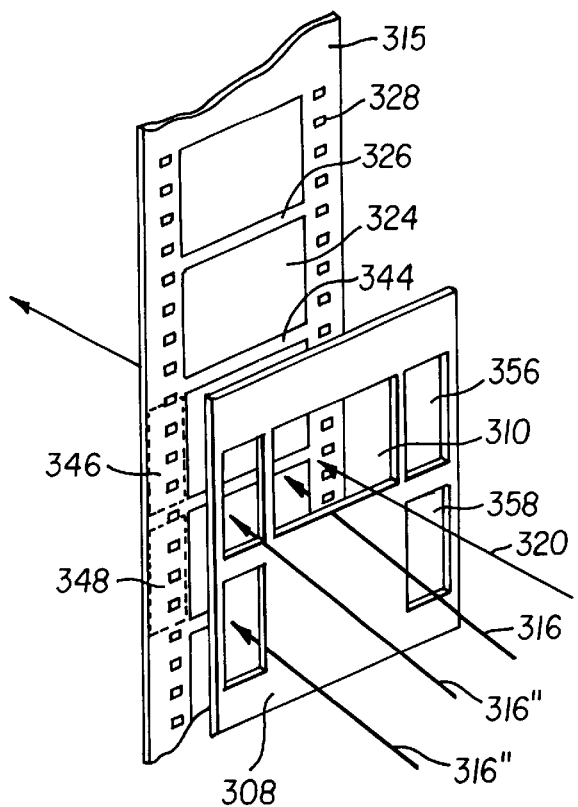
FIG. 11 is a perspective view of the film as it travels through the film gate illustrating various areas in which targeted heating can be applied advantageously.

Of course, targeted illumination to the film to frame edge areas cannot be provided without consideration for the design of the film gate. The film gate is shown conceptually in FIG. 11, in a simplified fashion, with only the film 315 and the aperture plate 308. As discussed previously, the altered illumination systems of FIGS. 8, 9, or 10 would employ beam steering optics to direct secondary beams to illuminate the film edge to frame edge areas. In FIG. 11, the primary beam 316 would pass through aperture 310 to illuminate film frame 344, while the secondary beams 316' would pass through secondary apertures 356 of aperture plate 308, so as to illuminate the target film edge to frame edge areas 346. However, generally there are a variety of fixtures within a film gate, most of which are located on the projection lens side of the gate. For example in one commercially available projector, the film gate is a flat structure, with the film edge guided with a slot. Within the slot, pressure plates push the film flat against the aperture plate. Many projectors used curved gates, in which metal bands or straps are sued to trap the film flush against the film gate and projection aperture. These bands are located to either side of the projected film frame, and press against the film in the film edge to frame edge areas. The bands typically extend for a few frames to either side of the projection aperture. Additionally, other film transport fixtures and assemblies, including sprockets, rollers, tensioners, and the sound head, occupy the space on the projection lens side of the film gate. It is sufficient to understand that while these components are not shown in FIG. 11, that a motion picture projector film gate is a mechanically constrained area.

Considering again FIG. 11, secondary apertures 356 of aperture 308 could be extensions of the aperture 310, such that there is effectively one large aperture to allow illumination by both the primary and secondary beams 316 and 316'. However, an aperture plate is then likely required on the projection lens side of the film gate, both to frame the projected image and to reduce flare light. Alternately, transparent windows could be mounted in secondary apertures 356 of aperture plate 308. While use of the windows would not help with framing or flare light, such windows would help in maintaining the film flatness and steadiness through the gate. Optimally, with regards to flare light and image framing, the target film edge to frame edge areas would be illuminated one or more frames prior to the film gate. Thus, the aperture plate 308 of FIG. 11 shows one frame offset alternate secondary apertures 358, through which the alternate secondary light beams 316" would be directed to illuminate and heat the target film edge to frame edge areas 348. As the applied heat does not dissipate from the film quickly, that heat would still be present a frame time later, when the film frame is illuminated. The net effect would still be full width heating, from film edge to film edge, and a decrease in film buckle. In this case, secondary apertures 356 shown on aperture plate 308 would not exist, while alternate secondary apertures 358 could contain a mounted glass substrate (such as fused silica), so that the longitudinal film position is controlled. It should also be understood that alternate secondary apertures 358 may be machined into an alternate assembly other than aperture plate 308. Also, the secondary beam steering and concentrating optics of FIGS. 8, 9, or 10 may be altered to shift the secondary illumination beams to become alternate secondary light beams 316", which traverse a somewhat offset path into the film gate. For example, in the FIG. 10 Fly's Eye system, the light pipe 470 could readily be routed to shift the beams 416' to heat the target film edge to frame edge areas one or more frames prior to the film gate. As another example, if the spillage light lost outside the aperture of the FIG. 9 system is large enough, beam shifting optics may not be needed, and it may be sufficient to condense some of the further off axis spillage light directly onto the film.

It should be understood that there are both variations to the designs and descriptions of the various embodiments, which fall within the scope of the present invention. For example, the Fly's Eye optics, which are used in the system of FIG. 8 to homogenize the light, could be replaced with an integrating bar (or "kaleidoscope"). Given the high power levels of arc lamps used in cinematic projection, it would likely be necessary to construct such a bar either with a low absorption, high melting temperature glass, such as fused silica or Pyrex™, or else as an open air light tunnel with mirror surfaces. Likewise, the Fly's Eye optics can be configured in other ways; for example with added lens elements (such as a lens at the $a_1$ plane of FIG. 8); or with the light integration initiated at other locations in the system (such as Fly's Eye integrator assembly 430 into proximity to the $a_1$ near field plane, rather than the $b_1$ far field plane) without significantly changing the fundamental function and performance of the system.

Also, the design for the secondary beam steering and concentrating optics may include provision for controlling the light level, so that the light falling onto the target film edge to frame edge areas is roughly of the same magnitude as the light within the projected frame. For example, this could be as simple as allowing manual insertion of neutral density or inconel filters.

It should also be understood that the targeted illumination to areas outside the film frame which is being illuminated for projection to the screen may also include illumination directed onto the framing bars 326 adjacent to the projected film frame 344 (see FIGS. 6a and 11). In this case, it is probably easier to have spillage light illuminate the framing bars, or to alter the Fly's Eye type system to over illuminate the frame, rather than to create separate beam steering and concentrating optics. Further, film buckle is primarily reduced by illuminating the frame edge to film edge areas, rather than by extending the illumination into the frame bars above and below the projected frame.

As noted previously, xenon arc lamps emit some near UV radiation. Given both the xenon emission spectra and the film absorption spectra, the potentially available UV radiation from ~250 to ~350 nm could be useful to heat the film edge to frame edge areas. Furthermore, in this wavelength range, the incident light is primarily absorbed by the base, rather than the dyes, and thus the heating is less dependent on the local density of the color dyes, such as from the sound tracks. Either of the base system configurations (FIGS. 8 and 9) could be altered to include one or more tilted filters, which reflect UV and transmit the visible. These filters would be located in a convenient location between the arc lamp source and the beam steering and concentrating optics. The reflected UV light would then be directed by parallel beam steering and concentrating systems to reach the target frame edge to film edge areas. Potentially, this UV light could be combined with the visible spillage light, with both focused together onto the film. Due to the general symmetry of the system, with a target area on either side of each film frame, parallel path optics would be needed on either side of the illumination optics which provide the visible light to the film frame area. Thus, such a system which utilizes some of the near UV emitted by the xenon arc lamp for film edge to frame edge illumination, is sufficiently complicated to probably be undesirable. Furthermore, while UV radiation will heat the film in a desirable manner, if the UV light is of sufficient magnitude, it will cause dye fade as it interacts with the emulsion layers, and thereby damage the sound tracks.

Figure 12:
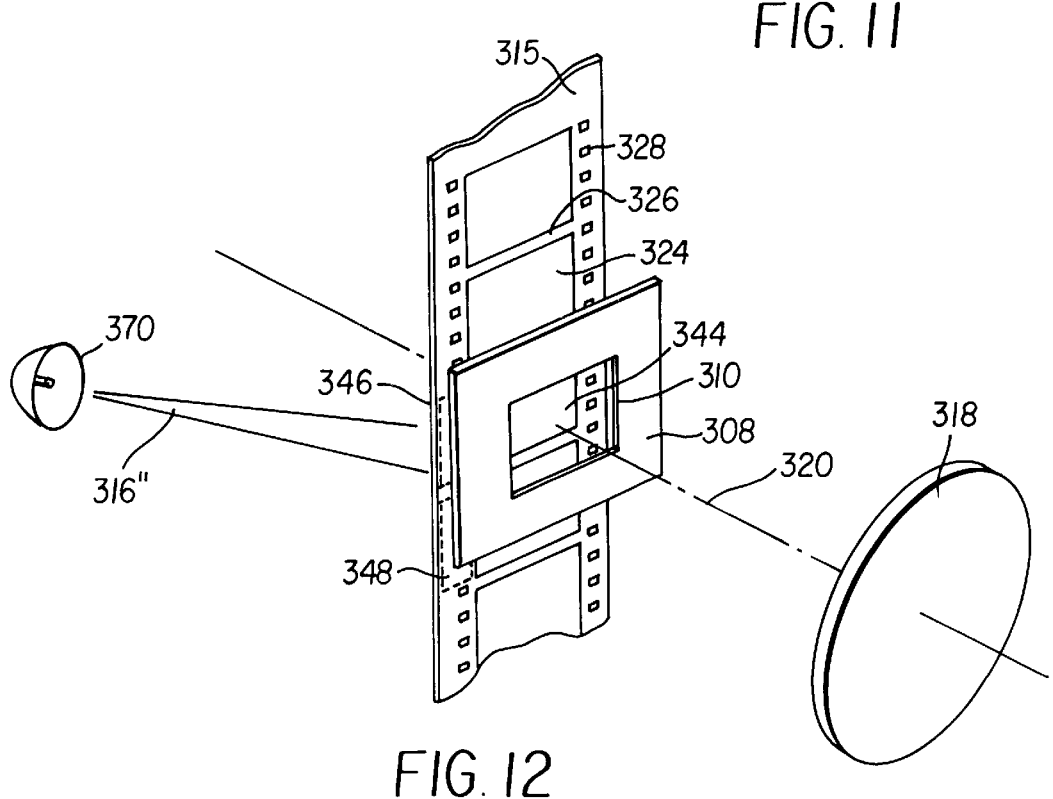
FIG. 12 is a perspective view of an alternate configuration for the film gate region of a film projector.

On the otherhand, rather than illuminating, and thus heating, the target areas between the film edges and the frame edges with radiation from the arc lamp light source for the film, secondary light sources, if sufficiently small and inexpensive, could be used instead. That is, the secondary light beams 316" of FIG. 12 could be provided by one or more secondary light sources 370, whose emitted light could be formed into secondary light beams by the lamp reflector and other optics (such as lenses (not shown)), as appropriate, rather than redirecting stray light from the arc lamp as in the prior embodiments. Of course, for effective heating, these light sources could either be near UV or visible light emitters. Most likely, the secondary light sources 370 would be small tungsten halogen or incandescent lamps. Depending on the design of a given projector, it may be easier to locate these secondary sources either on the lamphouse side, or the projection lens side, of the film gate. Most likely, such sources would direct light on to the film from the lamp house side, as depicted in FIG. 12. As before, the secondary light beams 316" could be directed to heat the film edge to frame edge areas 346 adjacent to the projected film frame 344, or alternately to heat film edge to frame edge areas 348 at a location a frame or two prior to the projection aperture. The projection lens side is less likely, given the various assemblies which are used in the film transport, utilize much of that space. However, it may be possible to use a light pipe or fiber bundle to locally introduce this light from the secondary sources, and thus conserve space. Further, if near UV would be absorbed within the film base, rather than by the emulsion, and the potential for dye fading would be further reduced.

FIG. 12 also depicts another alternate configuration, where the aperture plate 308 is located on the projection lens side of the film, rather than on the lamphouse side of the film. In this case, the aperture plate 308 can be simplified to only have aperture 310, through which film frame 344 will be imaged to the screen (not shown) by projection lens 318. Thus, aperture plate 308 is not complicated with the secondary apertures for illuminating the film edge to frame edge areas, as was the aperture plate 308 of FIG. 11, which was shown with secondary apertures 356 or alternate secondary apertures 358. The relative location of the aperture 308, on either the lamphouse or projection lens side of the film, will depend on other factors which effect the design of the film gate assembly and the overall projector. It should be noted that secondary light sources 370 could be used in combination with the appropriately designed aperture plate 308 located on either side of the film 314.

Finally, the secondary light sources 370 of FIG. 12 which create alternate secondary light beams 316" could be emitters of mid-infrared radiation, rather than visible or near UV. As a result of molecular stretching and bending, typical organic materials, such as those used in film, generally absorb light in the 3–6 micron wavelength range. Advantageously, light absorption at these wavelengths is largely independent of the image dye density, so the presence and darkness of any printed areas, such as within the sound track and stray light blocking areas, minimally effects the film heating efficiency. Furthermore, in this mid-infrared wavelength range, the film dyes are less sensitive to fading, as compared to respective fading sensitivities in either the visible or near UV spectra. Of course, in all cases, excessive heating of the film is to be avoided so that permanent film deformation or damage does not occur.

The invention has been described in detail with particular reference to certain preferred embodiments thereof, but it will be understood that variations and modifications can be effected within the scope of the invention. For example, the design concepts can be applied to other film imaging systems which could be impacted by film buckle, such as film scanners or high speed printers.

PARTS LIST

100. Motion picture film projector
102. Arc lamp
104. Elliptical reflector
106. Shutter
108. Aperture plate
110. Aperture
110'. Lines
112. Screen
114. Film frame
115. Film
116. Light beam
118. Projection lens
120. Geneva Mechanism
122. Sprocket
130. Driver
140. Star wheel
150. Focused spot
200. Illumination system
205. Arc lamp
207. Filter
208. Aperture plate
210. Aperture
213. Field lens
215. Film
216. Illumination beam
216'. Side lobe beam
218. Projection lens
220. Optical axis
225. Adjacent side lobes
230. Fly's Eye assembly
232. Field lens
234. Lenslet array
235. Lenslet array
236. Lenslet array
238. Field lens
250. Light
255. Side lobe
256. Side lobe
257. Side lobe
308. Aperture plate
310. Aperture
315. Film
316. Primary beam
316'. Secondary light beam
316". Alternate Secondary light beams
318. Projection lens
324. Film frame
326. Framing bars
340. Area
344. Film frame
345. Upper frame edges
345'. Side frame edges
346. Film edge to Frame edge areas
348. Film edge to Frame edge areas
356. Secondary Apertures
358. Alternate secondary apertures
400. Illumination system
405. Lamp
408. Aperture plate
410. Aperture opening
411. Beam shaping optics
413. Film gate field lens
415. Film
416. Illumination beam
416'. Side lobe beam
420. Optical axis
425. Condensing lens
430. Fly's Eye assembly
432. Field lens
434. Uniformizer lens
436. Lenslet array
438. Lenslet field lens -continued

PARTS LIST

444. Film frame
446. Frame edge areas
460. Off axis lens
465. Mirror
470. Condensing lens
475. Light pipe
500. Illumination system
502. Arc lamp
504. Elliptical reflector
505. Arc source
508. Aperture plate
510. Aperture
515. Film
516. Light beam
516'. Overfill light beam
520. Optical axis
546. Frame edge areas
560. Axis lens
565. Mirror

What is claimed is:

1. A motion picture film projector illumination system for minimizing film buckle comprising:
    a light source for producing a beam of light;
    beam shaping optics for focusing said light beam onto a film and illuminating a frame of said film;
    an aperture having an aperture opening corresponding to said illuminated film frame;
    secondary beam steering and concentrating optics for forming stray light into beams and directing said beams of stray light to illuminate film edge to frame edge areas.

2. A motion picture film projector illumination system as in claim 1 wherein said beams of stray light are directed through secondary aperture openings corresponding to said film edge to frame edge areas.

3. A motion picture film projector illumination system as in claim 2 wherein said secondary aperture openings are adjacent to said aperture opening corresponding to said illuminated film frame.

4. A motion picture film projector illumination system as in claim 2 wherein said secondary aperture openings are adjacent to a film frame which precedes said illuminated film frame.

5. A motion picture film projector illumination system as in claim 1 wherein said beam shaping optics comprises a fly's eye integrator.

6. A motion picture film projector illumination system as in claim 5 wherein said secondary beam steering and concentrating optics comprises a mirror and a lens.

7. A motion picture film projector illumination system as in claim 6 wherein said mirror is a non-imaging optical concentrator.

8. A motion picture film projector illumination system as in claim 1 wherein said secondary beam steering and concentrating optics comprises a mirror and a lens.

9. A motion picture film projector illumination system as in claim 8 wherein said a mirror is a non-imaging optical concentrator.

10. A motion picture film projector illumination system as in claim 1 wherein said beam shaping optics comprises an elliptical reflector.

11. A motion picture film projector illumination system as in claim 10 wherein said secondary beam steering and concentrating optics comprises a mirror and a lens.

12. A motion picture film projector illumination system as in claim 11 wherein said a mirror is a non-imaging optical concentrator.

13. A motion picture film projector illumination system as in claim 11 wherein said secondary beam steering and concentrating optics comprises a light pipe and a focusing lens.

14. A method for minimizing film buckle in a motion picture film projector illumination system comprising the steps of:
   producing a beam of light;
   shaping said light beam;
   directing said light beam through an aperture opening corresponding to a film frame so as to illuminate said film frame;
   collecting stray light; and
   directing said collected stray light to illuminate film edge to frame edge areas.

15. A method for minimizing film buckle in a motion picture film projector illumination system as in claim 14 wherein said directed stray light heats said film edge to frame edge areas thereby reducing film buckling.

16. A method for minimizing film buckle in a motion picture film projector illumination system as in claim 14 wherein said directed stray light pre-heats said film edge to frame edge areas prior to the illuminated film frame.

17. A motion picture film projector illumination system for minimizing film buckle comprising:
   a light source for producing a beam of light;
   beam shaping optics for focusing said light beam onto a film and illuminating a frame of said film;
   an aperture having a primary aperture opening corresponding to said illuminated film frame; and
   secondary light sources and beam steering and concentrating optics for directing light from said secondary light sources to secondary openings in said aperture to illuminate film edge to frame edge areas.

18. A motion picture film projector illumination system for minimizing film buckle as in claim 17 wherein said secondary openings in said aperture are offset from said primary aperture opening.

19. A motion picture film projector illumination system for minimizing film buckle as in claim 18 wherein said secondary openings in said aperture are offset from said primary aperture opening in a direction prior to illumination of said primary aperture opening.

20. A method for minimizing film buckle in a motion picture film projector illumination system comprising the steps of:
   producing a beam of light;
   shaping said light beam;
   directing said light beam through an aperture opening of an aperture plate, said aperture opening corresponding to a film frame so as to illuminate said film frame; and
   heating the film edge to frame edge areas.

21. A motion picture film projector for minimizing film buckle comprising:
   a light source for producing a beam of light;
   beam shaping optics for focusing said light beam onto a film to illuminate a frame of said film;
   an aperture plate having aperture openings corresponding both to said illuminated film frame and to film edge to frame edge areas which are adjacent to said frame and which precedes said illuminated film frame;
   wherein a portion of said beam of light illuminates said film edge to frame edge areas, thereby heating said film edge to frame edge areas.

22. A motion picture film projector with means for minimizing film buckle comprising:
   a light source for producing a beam of light;
   beam shaping optics for focusing said light beam onto a film to illuminate a frame of said film;
   an aperture plate having aperture openings corresponding both to said illuminated film frame and to film edge to frame edge areas which are adjacent to said illuminated film frame;
   wherein a portion of said beam of light illuminates said film edge to frame edge areas, thereby heating said film edge to frame edge areas.

* * * * *